No. 849,505. PATENTED APR. 9, 1907.
R. C. SCHROEDTER.
AUTOMATIC IRRIGATOR.
APPLICATION FILED DEC. 31, 1906.
4 SHEETS—SHEET 1.
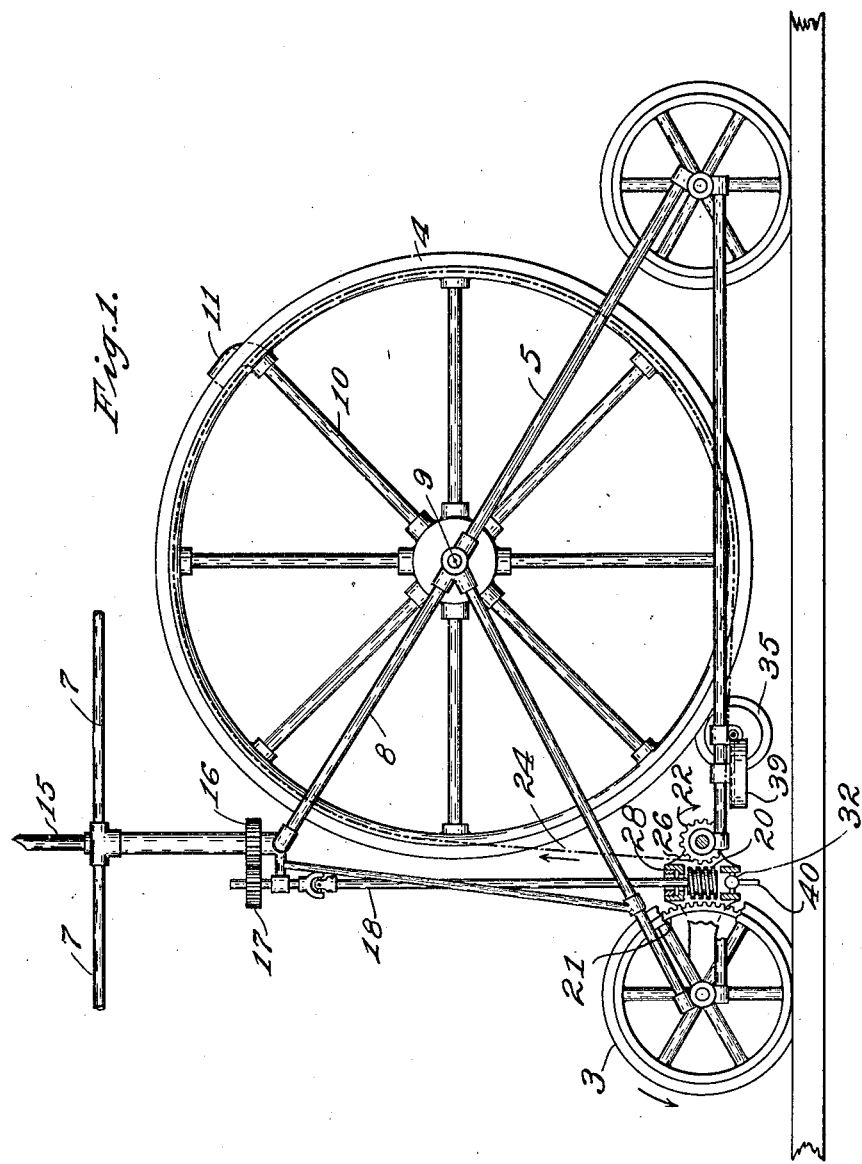
Witnesses:
Inventor,
Richard C. Schroedter
by Rummler & Rummler
Attorneys.

No. 849,505. PATENTED APR. 9, 1907.
R. C. SCHROEDTER.
AUTOMATIC IRRIGATOR.
APPLICATION FILED DEC. 31, 1906.
4 SHEETS—SHEET 2.
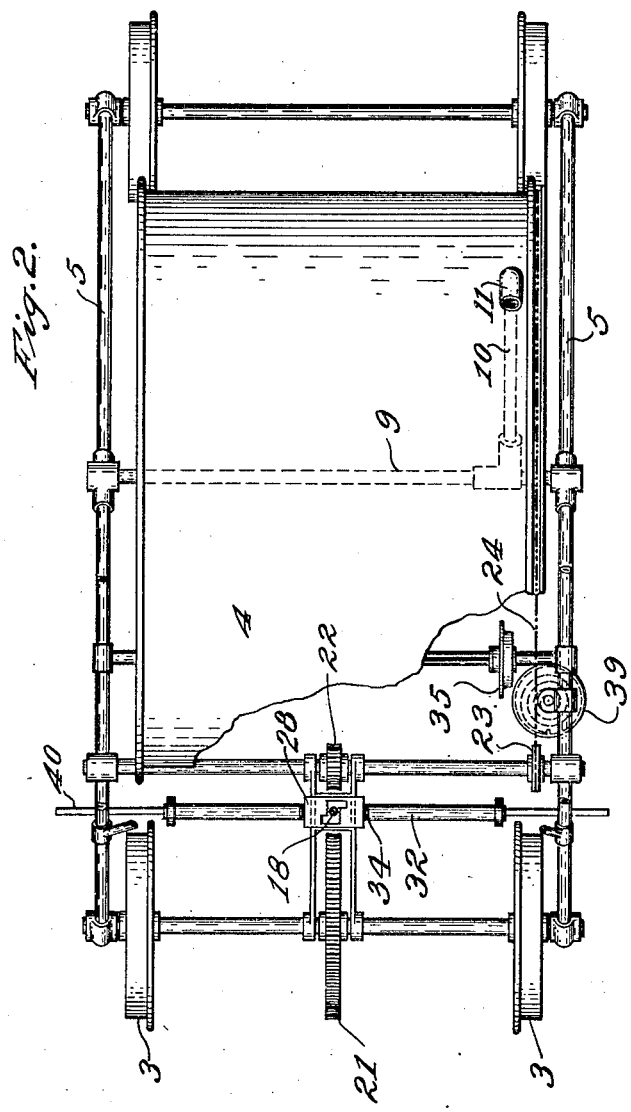

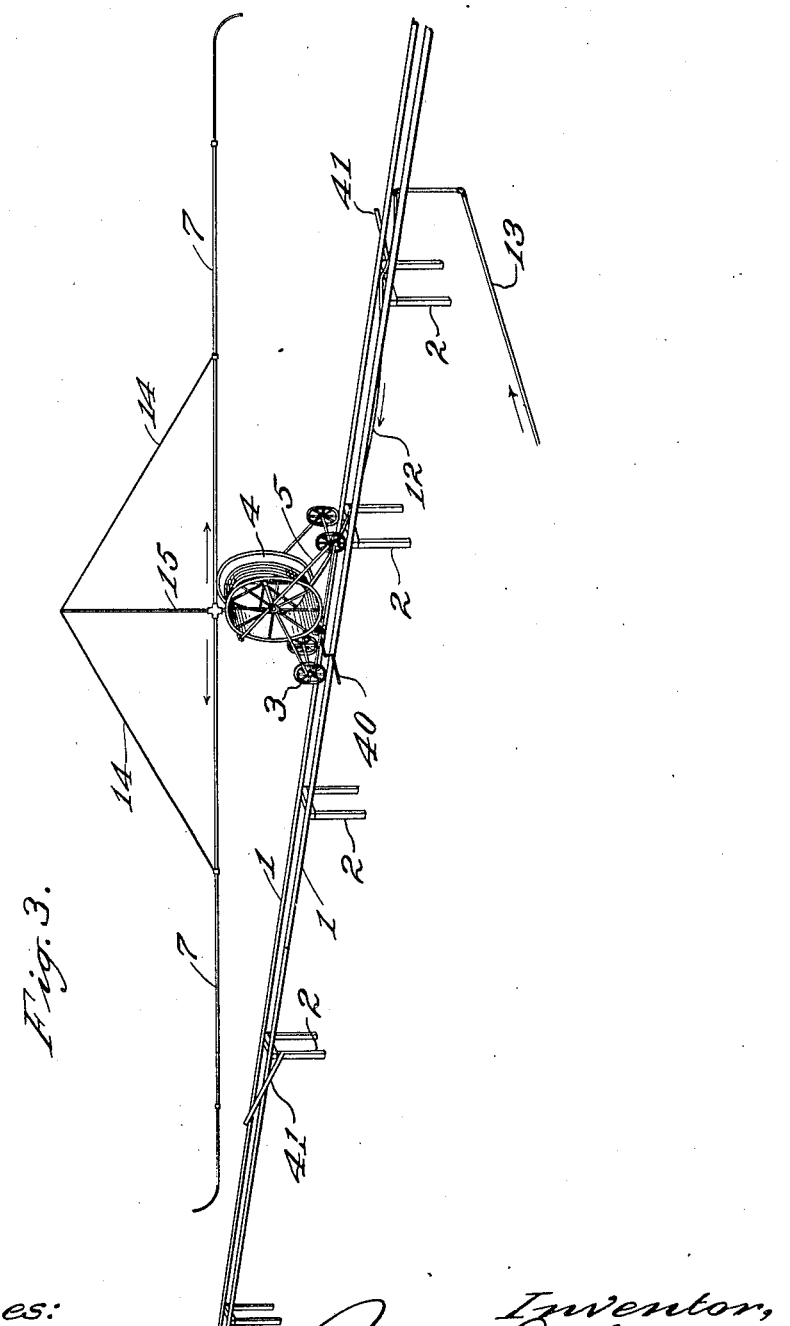

No. 849,505. PATENTED APR. 9, 1907.
R. C. SCHROEDTER.
AUTOMATIC IRRIGATOR.
APPLICATION FILED DEC. 31, 1906.
4 SHEETS—SHEET 4.
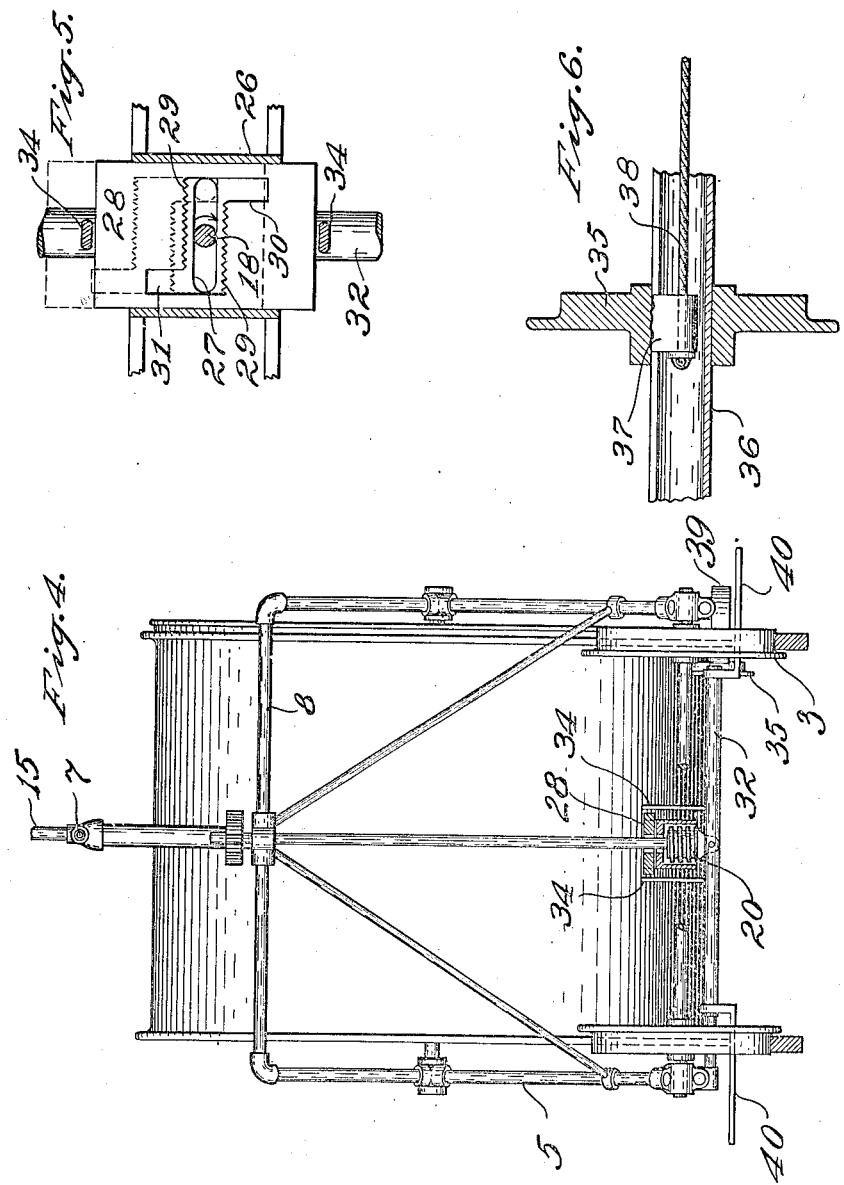

UNITED STATES PATENT OFFICE.

RICHARD C. SCHROEDTER, OF CHICAGO, ILLINOIS.

AUTOMATIC IRRIGATOR.

No. 849,505.     Specification of Letters Patent.     Patented April 9, 1907.

Application filed December 31, 1906. Serial No. 350,216.

*To all whom it may concern:*

Be it known that I, RICHARD C. SCHROEDTER, a citizen of the United States of America, and a resident of Chicago, in the county of Cook and State of Illinois, have invented certain new and useful Improvements in Automatic Irrigators, of which the following is a specification.

The main objects of this invention are to provide an improved form of irrigating apparatus comprising a sprinkler-carriage which may be automatically moved along by power derived from the water which is being discharged thereby, which may be connected with an outside source of water under pressure, and which will automatically control its own movements, so as to repeatedly pass over a certain predetermined course without requiring the continuous attention of an operator; to provide an irrigator of this class which may be connected by a flexible hose with the source of water and which will lay the hose along its course when moving away from the source of water and will reel up the hose during its return movement; to provide an irrigator which may be utilized for watering crops in places where the ground is too irregular to permit of the usual methods of irrigation by ditches; to provide a form of portable sprinkling apparatus which may be automatically driven over a straight or devious course and which will supply water to a comparatively large area without interference with tall crops, stumps, or other surface obstructions. These objects are accomplished by the device shown in the accompanying drawings, in which—

Figure 1 is a side elevation of an automatic irrigator constructed according to this invention, the sprinkler-arms being partly broken away and a portion of the framework being also broken away to illustrate the construction of the reversing mechanism. Fig. 2 is a top plan of the same, partly broken away. Fig. 3 is a perspective elevation of the same, on a smaller scale, showing the arrangement of the supporting-track and the method of connecting it with the source of water. Fig. 4 is an elevation of the irrigator viewed from the left of Fig. 1. Fig. 5 is a detail, viewed from above, of the reversing mechanism. Fig. 6 is a detail showing the method of mounting the guide-wheel on its shaft.

In the form shown in the drawings the irrigator comprises a light frame or carriage mounted upon wheels and adapted to ride upon a track such as is shown in Fig. 3. The track preferably consists of light wooden bars or rails which are carried by stakes 2, driven into the ground and spaced sufficiently near together to carry the weight of the carriage. The carriage is driven along the rails by mechanism connected with the wheels 3. A hose-reel 4 is journaled on a horizontal axis on the frame 5 of the carriage and is adapted to wind up a section of hose of considerable length. A sprinkler comprising a pair of horizontally-disposed arms 7 is journaled on a vertical axis in the frame 5 and connects, through the pipe 8, the hollow shaft 9, which supports the reel, a radially-disposed pipe 10, and an elbow 11 with one end of the hose 12. The other end of the hose 12 is connected by a pipe 13 with a suitable source of water under pressure, such as a water-main or an elevated tank. The arms 7 are curved in a horizontal plane at their ends, so as to discharge water therefrom in a tangential direction and cause the rotation of the sprinkler. The arms 7 being of considerable length are stayed by braces 14, connecting the same to a central upright 15, as illustrated in Fig. 3.

The sprinkler drives a pinion 16, which meshes with a second pinion 17, connected by a jointed shaft 18 with the worm 20. A worm-wheel 21, mounted on the axle of the wheels 3, is located in suitable position to mesh with the worm 20. The universal joint in the shaft 18 permits the worm 20 to be moved into and out of mesh with the worm-wheel 21. A second worm-wheel 22, journaled on the frame at the opposite side of the worm 20, is also adapted to mesh with said worm when said worm is shifted into engagement therewith. The worm-wheel 22 is arranged to drive a sprocket-wheel 23, which is connected by a link belt 24 with the reel 4. Since the worm 20 is directly connected with the sprinkler, it will be continuously driven in the same direction. The worm-wheels 21 and 22 being on opposite sides of the worm are driven in opposite directions. When the worm meshes with the worm-wheel 21, it rotates the wheels 3, so as to drive the carriage toward the left of Fig. 3—that is, away from the source of water. When the worm 20 meshes with the worm-wheel 22, the belt 24 causes the reel to rotate, so as to wind up the hose, and thereby pull the carriage toward the source of water.

The mechanism which shifts the worm 20 comprises a frame 26, which is provided with a guide-slot 27, Fig. 5, loosely engaging the shaft 18 and preventing a lateral movement of said shaft out of its direct path between the worm-wheels 21 and 22. The member 28 is slidably mounted in the frame 26 and is shiftable at right angles to the slot 27. The member 28 has a Z-shaped slot, the middle part of which is parallel with the slot 27 and of the same length and has serrated sides 29. The branches 30 and 31 of this slot are at right angles to the middle part and extend in opposite directions, being located at opposite ends of the slot, as in Fig. 5. When the member 28 is shifted toward either side, the shaft 18 comes into contact with the serrated side of the slot and through frictional contact therewith causes the shaft 18 to roll toward the corresponding branch slot 30 or 31. A further shifting of the member 28 then confines the shaft 18 and holds the worm in driving contact with the respective worm-wheel. The result of this action is illustrated in Fig. 5, the dotted lines showing the member 28 in its shifted position for securing the worm 20 in mesh with the worm-wheel 22.

The movement of the member 28 is accomplished by means of a shifting device comprising a hollow tube 32, which is horizontally disposed and pivoted at its middle point directly below the worm 20. (See Fig. 4.) This tube is closed at its ends and is partly filled with mercury, which acts as a counterpoised weight, since it tends to run toward the low end of the tube, and insures that when the tube 32 is inclined in either direction from an exactly horizontal position the weight of the mercury will cause the member 28 to be urged toward one side and insure the complete shifting of the worm to the opposite worm-wheel. The tube 32 is provided with upright arms 34, which bear upon opposite ends of the member 28 and cause it to shift through the tilting of the tube 32.

The winding up of the hose is guided by means of an idle guide-wheel 35, which is journaled on an axis parallel to the axis of the drum 4 and is slidably axially, so as to move along the drum with its periphery close to that of the drum. The guide-wheel 35 is carried by a hollow shaft 36, which is slotted, and a lug 37 extends inwardly from the wheel and has swiveled connection with a cord 38, which extends axially through the shaft 36. The cord 38 is wound upon a drum 39, which is provided with a spiral spring (indicated in Fig. 2) and normally tending to wind up the cord 38 and pull the guide-wheel 35 toward the position shown in Fig. 2. The pressure of this guide-wheel serves to cause the hose to wind closely upon the drum and prevents one coil of the same from crossing an adjacent coil and thereby tending to choke the flow of water through the hose. The pipe 32 is provided with extensions 40, which are located so as to engage projecting parts or dogs 41, which are fastened to the uprights 2 at points along the track where it is desired to reverse the motion of the carriage. These dogs 41 are detachably secured to the uprights in some suitable manner and present inclined surfaces upon which the extensions 40 will ride, causing the tube 32 to be shifted through the movement of the carriage, so as to cause the driving-worm to shift toward the opposite worm-wheel.

The operation of the device shown is as follows: Water is supplied under pressure by the pipe 13 and is conveyed to the sprinkler by means of the hose 12, which is wound around the drum 4 of the reel. Water issuing from the arms of the sprinkler 7 causes the same to rotate in the well-known manner, and this motion is imparted to the worm 20. The great leverage of the long arms 7 provides ample power for propelling the carriage slowly along its track. When the pipe 32 is balanced in its middle position, as in the drawings, the carriage remains stationary and the sprinkling is confined to the area spanned by the rotating arms 7. When the tube 32 is tilted in one direction, the member 28 will cause the worm to be shifted into engagement with the worm-wheel 21 and drive the carriage in a direction away from the pipe 13. As soon as the carriage arrives at the dog 41, which determines the limit of the movement of the carriage away from the pipe 13, the part 40 will ride upon the corresponding dog 41 until the worm 20 has been shifted out of engagement with the worm-wheel 21 and stop the further advance of the carriage. In the normal operation of the device the momentum of the carriage is always sufficient to carry the same a sufficient distance to insure that the tube 32 is tilted beyond its middle position by the dog 41, and the mercury in the tube then supplies the necessary pressure upon the member 28 to insure that the worm 20 shifts into engagement with the worm-wheel 22. This causes the drum to rotate and wind up the hose, pulling the carriage toward the pipe 13. When the other dog 41 engages the other extension 40 of the tube 32, the movement of the carriage is again reversed. The device thus automatically travels backward and forward between the dogs 41 until it is stopped by cutting off the water-supply after a sufficient amount of water has been spread upon the area traversed. By adding another section of hose and shifting the position of the dogs 41 the device may be caused to traverse a new section of the track.

What I claim as my invention, and desire to secure by Letters Patent, is—

1. The combination of a carriage, a rotary sprinkler mounted thereon and adapted to rotate through the force of water passing through it, a hose connecting said sprinkler with an outside source of water, a reel on said carriage arranged to hold said hose without disturbing its connection with said sprinkler, mechanism operated by said sprinkler for rotating said reel so as to wind up the hose and pull the carriage along, and mechanism operated by said sprinkler for driving said carriage in the opposite direction.

2. The combination of a carriage, a rotary sprinkler mounted thereon and adapted to rotate through the force of water passing through it, a hose connecting said sprinkler with an outside source of water, a reel on said carriage arranged to hold said hose without disturbing its connection with said sprinkler, mechanism operated by said sprinkler for rotating said reel so as to wind up the hose and pull the carriage along, mechanism operated by said sprinkler for driving said carriage in the opposite direction, and automatically-operated means for alternately connecting said mechanisms with said sprinkler to cause the carriage to travel back and forth along its course.

3. An irrigator comprising a carriage, a rotary sprinkler mounted thereon and adapted to rotate through the force of water passing through it, a hose connecting said sprinkler with an outside source of water, a reel on said carriage arranged to wind up or unwind said hose without disturbing its connections with the sprinkler and source of water, a worm arranged to be driven by said sprinkler, a pair of worm-wheels located at respectively opposite sides of said worm and spaced apart so as to permit said worm to mesh with but one of said wheels at a time, one of said wheels having driving connection with the wheels of the carriage for propelling the same and the other worm-wheel having driving connection with said reel for causing the same to rotate so as to wind up said hose, and a controlling device adapted to shift said worm from one of said worm-wheels to the other, said controlling device being adapted to automatically shift said worm to its opposite position when said carriage has moved a certain predetermined distance.

4. An irrigator comprising a carriage, a rotary sprinkler mounted thereon and adapted to rotate through the force of water passing through it, a hose connecting said sprinkler with an outside source of water, a reel on said carriage arranged to wind up or unwind said hose without disturbing its connections with the sprinkler and source of water, a worm arranged to be driven by said sprinkler, a pair of worm-wheels located at respectively opposite sides of said worm and spaced apart so as to permit said worm to mesh with but one of said wheels at a time, one of said wheels having driving connection with the wheels of the carriage for propelling the same and the other worm-wheel having driving connection with said reel for causing the same to rotate so as to wind up said hose, and a controlling device adapted to shift said worm from one of said worm-wheels to the other, said controlling device being adapted to automatically shift said worm to its opposite position when said carriage has moved a certain predetermined distance, said reversing means comprising a counterpoised mercury-tube adapted to normally urge said worm toward either limit of its movement, when inclined toward the corresponding side of a horizontal position, substantially as described.

5. In an irrigating apparatus, the combination of a carriage, a rotatable sprinkler mounted thereon, a hose connecting said sprinkler with an outside source of water, a worm on said carriage driven by said sprinkler and having a limited lateral movement on the carriage, a pair of worm-wheels located at respectively opposite sides of said worm and being adapted to respectively drive said carriage in opposite directions, a guide for directing the movement of said worm from one of said worm-wheels to the other, and mechanism comprising a counterpoised weight and a friction shifting member controlled by said weight and adapted through the rotation of the sprinkler to shift said worm into engagement with one of said worm-wheels when said weight is moved to one side of a balanced position and to shift said worm into mesh with the other worm-wheel when said weight is moved to the opposite side of a balanced position.

Signed at Chicago this 28th day of December, 1906.

RICHARD C. SCHROEDTER.

Witnesses:
FRED PEULECKE,
E. A. RUMMLER.